(No Model.)
J. B. GRANJON & C. BELLON.
MANUFACTURE OF HOLLOW BLOCKS.
No. 525,202. Patented Aug. 28, 1894.
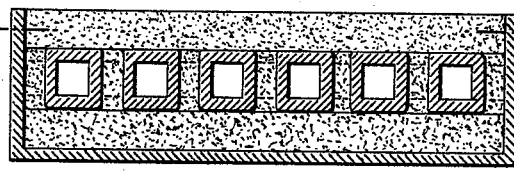
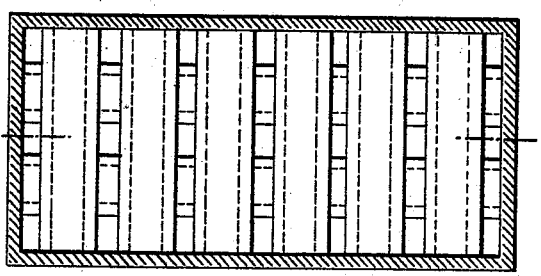
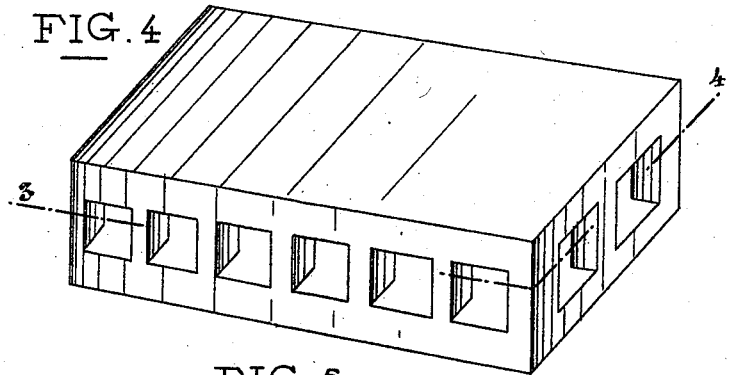
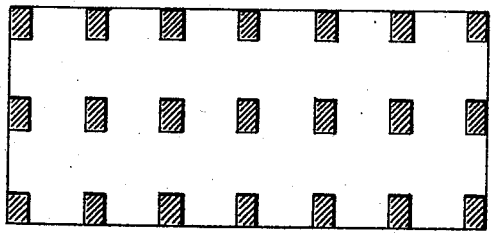

UNITED STATES PATENT OFFICE.

JEAN BENOIT GRANJON AND CAMILLE BELLON, OF LYONS, FRANCE.

MANUFACTURE OF HOLLOW BLOCKS.

SPECIFICATION forming part of Letters Patent No. 525,202, dated August 28, 1894.

Application filed December 29, 1893. Serial No. 495,093. (No model.) Patented in France June 24, 1893, No. 231,070.

*To all whom it may concern:*

Be it known that we, JEAN BENOIT GRANJON and CAMILLE BELLON, citizens of the Republic of France, residing at Lyons, Department of the Rhône, in the Republic of France, have invented certain new and useful Improvements in the Manufacture of Hollow Blocks and Similar Articles for Building and Decorative Purposes, (for which we have received a patent in France, dated June 24, 1893, No. 231,070,) of which the following is a specification.

This invention has for its object an improved process of manufacture for producing hollow blocks and similar articles of all kinds, composed of plaster, cement, lime, slag and the like, and in general for producing material for building purposes, ornamentation, or decoration.

The invention consists in first making suitable molds of wood, cast metal, cement or the like, with interiors shaped exactly to the external form of the blocks or other articles which it is desired to produce. A number of tubes, or bars of any desired cross-section, preferably of earth, are then placed in these molds, so as to cross one another and thus form interstices. By varying the arrangement and distance apart of the tubes in the molds, the thickness of the internal divisions in the articles ultimately formed may be regulated as desired, and the size of the interstices in the same may be regulated by varying the dimensions of the tubes as will be hereinafter explained. When the molds have been prepared in the above manner, they are filled with the substances from which the articles are to be formed, such as plaster, cement, slag, or other compounds, in a suitable liquid, or plastic condition. At the end of about ten minutes, the material will have set, and can be removed from the molds. Blocks are thus obtained which have exactly the form of the article required, but in which the crossed tubes previously mentioned remain, and, after the latter have been removed, interstices or perforations will be left in the blocks, exactly corresponding to the tubes as regards dimensions, form and arrangement. In order to remove these tubes, it is usually sufficient to calculate on the shrinkage which earth undergoes on drying, and which allows of the tubes being withdrawn, especially when freshly made tubes are employed. In those cases where tubes previously dried are employed, and also where the tubes cross one another in the inside of the articles or blocks, in such a manner as to prevent their withdrawal, it suffices to immerse the blocks in water or to water them. The earth is thus disintegrated and carried away gradually with the water. Articles or blocks are thus obtained which have intercrossing spaces or perforations forming cells in every direction.

On the accompanying drawings, there are shown as an example in Figures 1 and 1ª, an elevation and plan view of one of the tubes intended to be employed as hereinbefore described; Fig. 2, an elevation of a mold with its tubes fitted, the stippled parts indicating the parts which are to be filled ultimately with the substance employed at the time of casting for forming the complete block; Fig. 3, a sectional plan view on the line 1—2 of Fig. 2; Fig. 4, a perspective view of the block after it has been removed from the mold; Fig. 5, a sectional plan view of the same block on the line 3—4.

By this invention, the problem of rapid, economical and hygienic building construction is solved.

Various small modifications may be introduced in the hereinbefore described mode of carrying out the invention according to the nature of the materials employed, and the dimensions and shape of the articles to be formed. Thus, in the case of blocks of large size, or where the material of which they are to be composed requires to be compressed, they may be rammed down during the molding.

Although earth has been mentioned herein as a suitable substance for forming the tubes, this material being considered to be the most economical and the most convenient for use, it is not intended to limit the invention to the use of the same alone, the right being reserved of using any other suitable substance capable of producing the same results under the same conditions of employment.

We declare that what we claim is—

1. The hereinbefore described method of producing hollow or perforated blocks or similar articles of plaster, cement, slag, or the like material for building or decorative purposes, which consists in casting the same in molds, made of wood, cast-iron, cement or the like, in which a number of tubes or bars, formed of earth or other material capable of disintegration when in contact with water, are placed crossing one another, or otherwise arranged according to the interstices or perforations which it is desired to produce in the molded article, then, after the material has set, removing from the molds the molded articles in which are embedded the tubes or bars, and dissolving or washing out with water the said tubes or bars so as to produce in the blocks a number of perforations or interstices of the desired shape, position and dimensions, substantially as hereinbefore set forth.

2. In an apparatus for use in the hereinbefore described method of producing hollow or perforated blocks or similar articles of plaster, cement, slag or the like material, for building, or decorative purposes, a number of tubes or bars made of a material capable of disintegrating when in contact with water, in combination with a mold of suitable material, the said tubes or bars being disposed therein according to the number and form of the perforations or interstices which it is desired to produce in the molded article, substantially as hereinbefore set forth.

In testimony whereof we have signed our names to this specification in the presence of two subscribing witnesses.

JEAN BENOIT GRANJON.
    CAMILLE BELLON.

Witnesses:
 XAVIER JANICOT,
 JEAN GERMAIN.